United States Patent
de Oliveira (10) Patent No.: US 10,294,792 B2
(45) Date of Patent: May 21, 2019

(54) SPLIT-CHAMBER ROTARY ENGINE IMPROVEMENTS

(71) Applicant: Egidio Lucas de Oliveira, Arden, NC (US)

(72) Inventor: Egidio Lucas de Oliveira, Arden, NC (US)

( * ) Notice: Subject to any disclaimer, the term of this patent is extended or adjusted under 35 U.S.C. 154(b) by 0 days.

(21) Appl. No.: 15/487,425

(22) Filed: Apr. 13, 2017

(65) Prior Publication Data

US 2018/0298757 A1    Oct. 18, 2018

(51) Int. Cl.
| F02B 53/04 | (2006.01) |
| F01C 20/24 | (2006.01) |
| F01C 3/04 | (2006.01) |
| F04B 31/00 | (2006.01) |
| F02B 53/06 | (2006.01) |

(52) U.S. Cl.
CPC ............. *F01C 20/24* (2013.01); *F01C 3/04* (2013.01); *F02B 53/06* (2013.01); *F04B 31/00* (2013.01)

(58) Field of Classification Search
CPC .. F01C 20/24; F01C 3/04; F01C 21/08; F01C 1/3448; F02B 53/06; F04B 31/00
USPC ................................................ 123/205, 208
See application file for complete search history.

(56) References Cited

U.S. PATENT DOCUMENTS

| 1,309,735 | A | * | 7/1919 | Henig | F02B 53/00 123/223 |
| 1,351,933 | A | * | 9/1920 | Van Osdel | F01C 1/344 123/223 |
| 1,368,359 | A | * | 2/1921 | Scott | F02B 53/00 123/169 CA |
| 1,369,070 | A | * | 2/1921 | Ogden | F02B 53/08 123/223 |
| 1,556,600 | A | * | 10/1925 | Hardy | F02B 53/00 123/223 |
| 2,239,998 | A | * | 4/1941 | Fellegi | A41D 27/10 2/125 |
| 2,354,486 | A | * | 7/1944 | Spitzer | F02B 53/00 123/224 |
| 3,078,118 | A | * | 2/1963 | Dzienis | B62D 25/025 296/198 |
| 8,056,527 | B2 | | 11/2011 | De Oliveira | |
| 2008/0044306 | A1 | * | 2/2008 | Georgiev | F01B 1/12 418/142 |
| 2010/0122684 | A1 | * | 5/2010 | De Oliveira | F01C 1/3446 123/223 |

* cited by examiner

Primary Examiner — Patrick Maines (57) ABSTRACT

This invention relates to the field of internal combustion engines and compressors in general and to linear compressors, in particular these used as in U.S. Pat. No. 8,056,527, by accurately controlling the pressure being delivered into the combustion chambers of said engine while returning unused energy of the compression phase into the motor for complete expansion.
Another improvement relates to a pressure compensated vane to be used inside grooves of the motor assembly rotor. This invention enables the vane to seal against the cavity of the housing tightly with minimal force.

11 Claims, 9 Drawing Sheets

FIG 1

FRONT VIEW

FIG 9

SPLIT-CHAMBER ROTARY ENGINE IMPROVEMENTS

BACKGROUND OF THE INVENTION

Field of the Invention

This invention relates to compressors in general and in particular to linear compressors. It was developed for use in air compressors used in rotary internal combustion engines having distinct compression and power (motor) modules.

The present inventions relate generally to the split-chamber rotary engine and improves it functioning through the use of a controlling device that varies the pressure to a linear compressor and a motor assembly and a pressure compensating vane that.

Description of Related Art

It is well known that the basic mechanism of the piston engine has inherent drawbacks that can not be overcome, such as:

1- Around the point where the pressure developed by the burning of the air-fuel mixture is maximum (Top Dead Center, or TDC), the engine produces little or no torque, because the moment-arm is close to zero.

2- At mid-stroke, the moment-arm is maximum, but the pressure is about half-spent, and the friction force between the piston and cylinder wall is maximum.

3- Higher compression rates, which are desirable in terms of efficiency, can not be achieved in a gasoline fueled engine, because the heat of compression elevates the temperature above the point of auto-ignition. This causes premature explosion of the mixture, often before the piston reaches TDC. The negative torque subtracts power from the engine.

Besides, detonation creates high power shock waves that damages the engine.

4- There is only one power stroke for every four strokes of the piston (typical Otto and Diesel Cycles) or two full revolutions of the crank-shaft. Roughly, usable torque is delivered in only 160 degrees for every 720 degrees of revolution, or 22%.

5- During idling or low power demand, all cylinders are compressing air or air-fuel mixtures and wasting energy.

To get around problem 3, additives must be mixed into the gasoline, elevating the "octane" content and increasing the cost of the fuel.

Problem 4 is mitigated by incorporating multiple cylinders in an engine.

For instance, to obtain high power continuously during the rotation of the engine operating with the 4-stroke cycle, 12 cylinders are required. This results in a smooth running but highly complex and costly engine.

For this reason, four, six and less often eight cylinder engines equip most automobiles today.

Two-stroke engines, rarely used in automobiles and trucks, have the same problems as four-stroke ones, with figures shown in 4 being 320 and 44%, but with added problems of their own that can not be discussed in this short essay.

In many applications, a controlled discharge pressure that matches power demands is desirable.

Particularly in the internal combustion engines, variable compression ratio, is a very desirable characteristic but difficult to achieve in the conventional piston engines.

However, in a internal combustion rotary engine of the split chamber configuration, such as described in U.S. Pat. No. 8,056,527, this invention easily complements the inherent variation of the compression ratio with the control of the air/fuel ratio to precisely match the ideal power and emission requirements.

Another improvement relates to the field of fluid power in general and to vanes used in vane motors and vane pumps and compressors in particular.

It was developed specifically to reduce the high forces necessary to seal the tip of the vanes such as used in internal combustion engines particularly as the one described in U.S. Pat. No. 8,056,527.

In many applications, a controlled discharge pressure that matches power demands is desirable.

Particularly in the internal combustion engines, variable compression ratio, is a very desirable characteristic but difficult to achieve in the conventional piston engines.

However, in a internal combustion rotary engine of the split chamber configuration, such as described in U.S. Pat. No. 8,056,527, this invention easily complements the inherent variation of the compression ratio with the control of the air/fuel ratio to precisely match the ideal power and emission requirements.

SUMMARY OF THE IMPROVEMENTS

It is desirable to control the pressure generated by a free-piston type engine in order to improve performance, reduce pollutants and conserve energy.

In the particular case of a free-piston type compressor used in an engine like the split-chamber engine, U.S. Pat. No. 8,056,527 (E. Lucas de Oliveira, inventor), controlling the pressure permits the motor to run with a near stoichiometric mixture through its power demand range, improving efficiency and minimizing pollution.

In addition, a variety of fuels having a wide range of auto-ignition temperatures can be used in the same engine.

Respecting to the vane improvement, a recess under the rounded part of the tip of the vane having approximately the same area as the top, thus canceling the forces there developed by the pressure side of the vane.

The body of the vane is lodged in a groove within the rotor and is not subject to the forces developed by the pressure side of the expansion chamber.

The sealing force required by this improvement is small compared to classic vane design. We anticipate that centrifugal forces developed during engine operation plus a low pressure of lubricating oil under the vane will suffice to keep sealing at the tip. A compression spring placed below the valve can also be used as a means to push the vane outwardly against the cavity of the housing to accomplish the sealing.

A potential drawback is the dead volume created by the pockets required to contain the head of the vane. It is desirable to keep this dead volume to a minimum so so as as to minimize pressure losses.

A means to practically eliminate the pocket is to add a filler piece to the bottom of the rounded part of the vane whose top will be raised up to the periphery of the rotor at the appropriate time by means of a cam.

On the second improvement, the tip of the vane is the surface more prone to wear and to leak from the pressure side to the vented side of any pump or engine of this design.

It follows that the contour of the tip of the vane is rounded to follow the housing cavity where it is contained. This rounded tip produces a force exerted by the pressure side on its tip that tends to push the vane towards the center of the rotor and consequently loose its peripheral seal.

These forces can be significant to the point that very strong springs must be used to maintain the vane in contact with the cavity of the pump or motor, often surpassing 300 lb.

This is particularly critical for air or gas driven motors. In the case of liquid (oil and water mostly) pumps and motors the vanes are lubricated by these very fluids.

In the particular case of an internal combustion engine like the one described on U.S. Pat. No. 8,056,527 "split-chamber Rotary Engine", these forces would require very strong compression springs or elevated oil pressure for adequate sealing.

It is desirable to have a force that varies with the pressure of the expansion chamber, balancing the downward force with an equal or slightly larger opposite force in order o keep sealing at the tip.

To better understand the improvements, relate to the the following: An object of the present invention is to completely expand the burnt air/fuel mixture during the power stroke. The piston engines exhaust the gases at 100 psi thus wasting significant energy in a way to save fuel, reduce air pollution, and maximize power.

See the Lucas cycle comparison with the Otto cycle.

A further objective of the present invention is to operate in near optimal combustion conditions (stoichiometric) through high and low power demands. This means more economy for the same power generated and less pollutants.

A further object of the present invention is to control power by reducing or increasing the number of explosions per cycle, instead of varying the quantity of fuel in a fixed volume of air. Leaner mixtures produce more NOx, gases responsible for smog & acid rain.

A further objective of the present invention is to produce high torque at lower speeds, thus allowing power to flow directly from the clutch to the differential mechanism. Coupled with the capability to varying the number of explosions per cycle, it does away with the expensive gearbox.

In a 2×3 engine configuration, the ratios will be 6×1, 3×1, 2×1, 1×1

A further objective of the present invention is to use idling piston engines, typical of stop-and-go traffic, waste a lot of fuel and its exhaust gases are responsible for most of the air pollution in large urban areas.

The Lucas engine only compresses air for the active cylinder, and runs only to keep the rotor moving. Thus, it needs only a minimum of explosions, even one every two, or ten revolutions.

For a quick calculation, say a 6 cyl piston engine revving up at 800 RPM produces 6×800/2=2400 explosions in one minute.

A Lucas engine, 2×3 configuration conservatively rotating at 60 RPM with only one explosion per cycle will generate 60 explosions in one minute, or 40 times less volume of gases.

A further objective of the present invention is to compress air only, and not the air/fuel mixture, the Lucas Engine can use higher compression rates for lighter fuels like gasoline, because pre-ignition is eliminated by design. There is no need to put expensive anti-knock additives in the gasoline. The result is a higher efficiency, or more economy in the operation of the Lucas motor.

A further objective of the present invention is to use simplicity in construction. Only two cylinders and three cavities in the rotor do the work of a twelve cylinder piston engine (to produce six power strokes per revolution). Even when compared to the four cylinder engine that today powers most automobiles, the reduction in components of the Lucas engine is impressive.

A further objective of the present invention is to use lower discharge temperatures and much lower production of NOx gases will greatly reduce the expense of components of a catalytic converter or even eliminate the need for one.

A further objective of the present invention is to use a variable compression ratio is a much desired characteristic of internal combustion engines (see 2- above). Some very expensive engines developed complicated mechanisms to accomplish this. The Lucas engine has this feature built into its design. Increasing the fuel in the air/fuel mixture produces more pressure in the combustion chamber, automatically increasing piston travel and air reservoir pressure. Decreasing the fuel content has the reverse effect. The neat result is bringing back a near ideal operation.

A further objective of the present invention is to use lower weight to power ratio comes from lower size coupled with high torque and the elimination of gearboxes.

DETAILED DESCRIPTION OF THE PREFERRED EMBODIMENTS

Over the past one hundred years different mechanisms have been invented, mostly of the rotary type, without commercial success. All these inventions had the rotor perform the compression duty as well as the motor duty and follow the Otto or Diesel cycles.

This was done by mounting the rotor and its shaft eccentrically to the housing cavity so that a variable volume would be created in the space there between by the movement of the rotor.

Our engine is completely different from all these because the rotor and housing are concentric and it separates the compression and motor mechanisms.

Following is a simplified explanation of the engine, its basic operating principle and a discussion of its advantages.

Figures 7A, 7B, 7C, 7D:
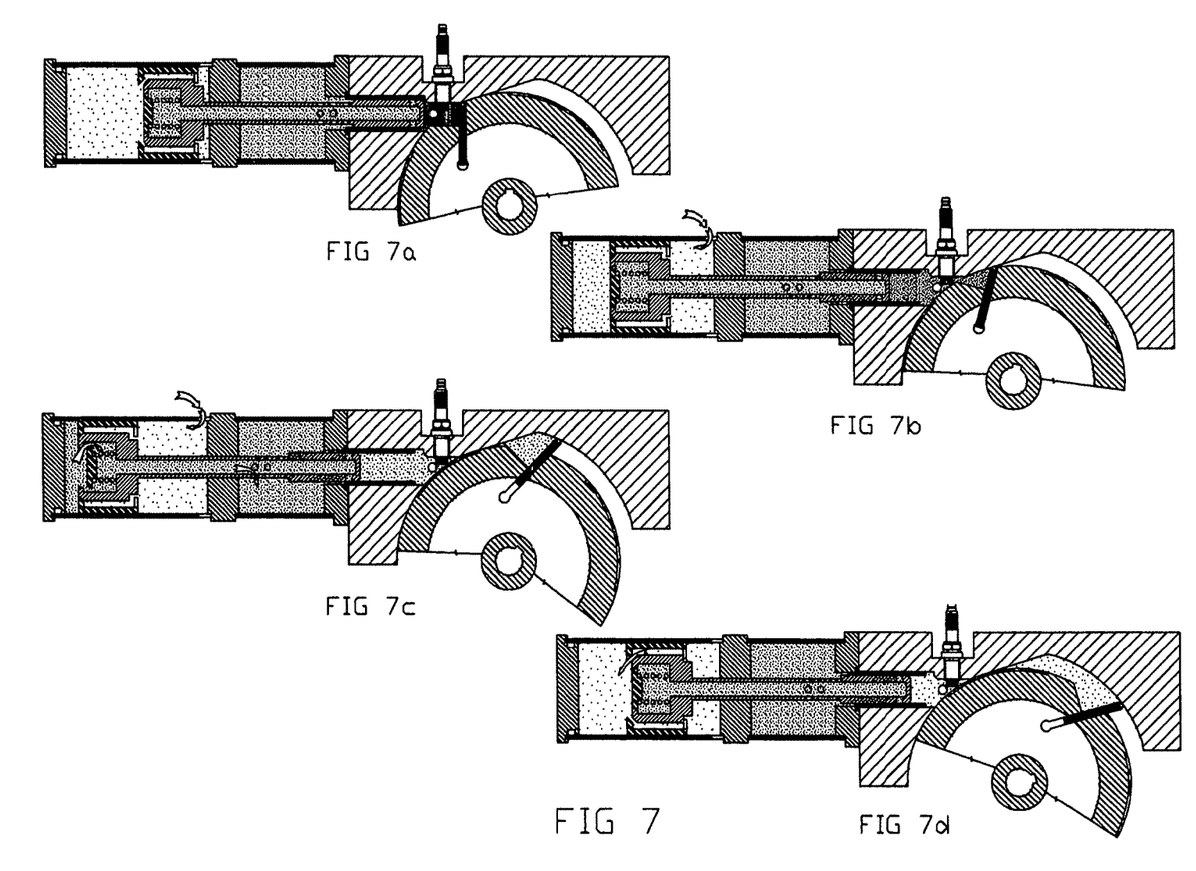
FIG. 7 Is a collection of 4 drawings identified as 3*a*, 3*b*, 3*c* and 3*d*, depicting the stages of the combustion process.

FIG. 7 depicts a one compressor and one rotor half-chamber in a schematic view of the engine used to show the basic functions within, through a complete power cycle.

The compressor consists of a hollow piston contained within a cylinder which is divided into two parts, the compression chamber near the blind end and a pressure reservoir close to the housing. There are a series of orifices on the outside of the cylinder near the divisor that permit fresh air to get behind the piston. The blue arrows show the flow of air.

The small end of the hollow piston is positioned against the combustion chamber within the housing and its face is one of the movable walls. orifices situated close to the end of the small piston allow compressed air to flow into the combustion chamber when the piston assembly is at the nearest position relative to the rotor.

Other orifices situated behind the small piston permit the passage of air from the compression chamber into the pressure reservoir through the hollow shaft.

FIGS. 7-3a Shows the moment in which the rotor half-chamber coincides with the housing half-chamber. Immediately prior to this the fuel is injected into the combustion chamber by an injector (not shown) situated perpendicularly to the plan of the picture. At this moment, the spark plug ignites the air-fuel mixture.

FIGS. 7-3b The piston within the compressor module is driven towards the end of the cylinder by the force of the expanding combustion gases, compressing air within the distal chamber. Simultaneously, the rotor is driven in the opposite direction by reaction to the force developed on the piston, much as the recoil of a firearm.

FIGS. 7-3c The vane located within a groove in the rotor follows the cavity in the housing, creating an expanding volume where the energy of the gases from the rotor half-chamber is converted into rotational torque.

Meanwhile, the pressure at the far end of the cylinder reaches a value larger than that of the reservoir, and a spring loaded check valve allows compressed air to flow into the reservoir, completing the charge for the next cycle.

FIG. 7-d The two half-chambers now communicate via a peripheral recess and the semi-spent gases used to compress air in the compressor are allowed to fully expand behind the vane, producing more usable work.

As the pressure drops in the combustion chamber, the spring-loaded valve closes and the piston rebounds towards the combustion chamber. An outer sleeve of the piston acts as an admission valve, allowing fresh air to enter the compression chamber.

The principal characteristic of this engine is that it mechanically separates the compression phase of the cycle from the power phase, by splitting the combustion chamber. As result, the same explosion simultaneously powers the compressor and the rotor.

By eliminating the mechanical linkage between compressor and rotor, all of the inherent problems of the piston engine and most of those from the rotary engines are eliminated.

Figure 8:
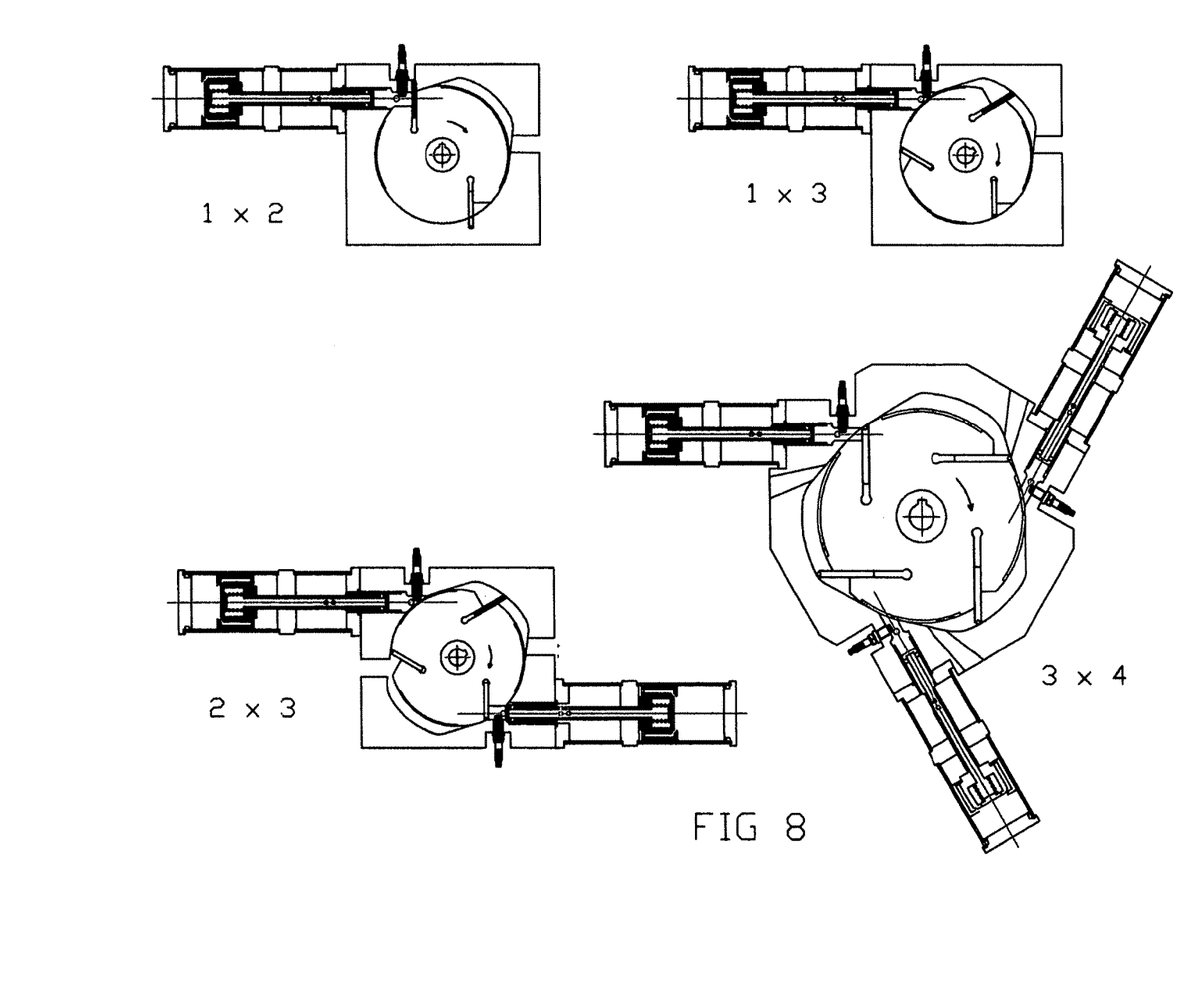
FIG. 8 shows multiple configurations of compressors and rotor cavities possible for the Lucas engine.
Figure 9:
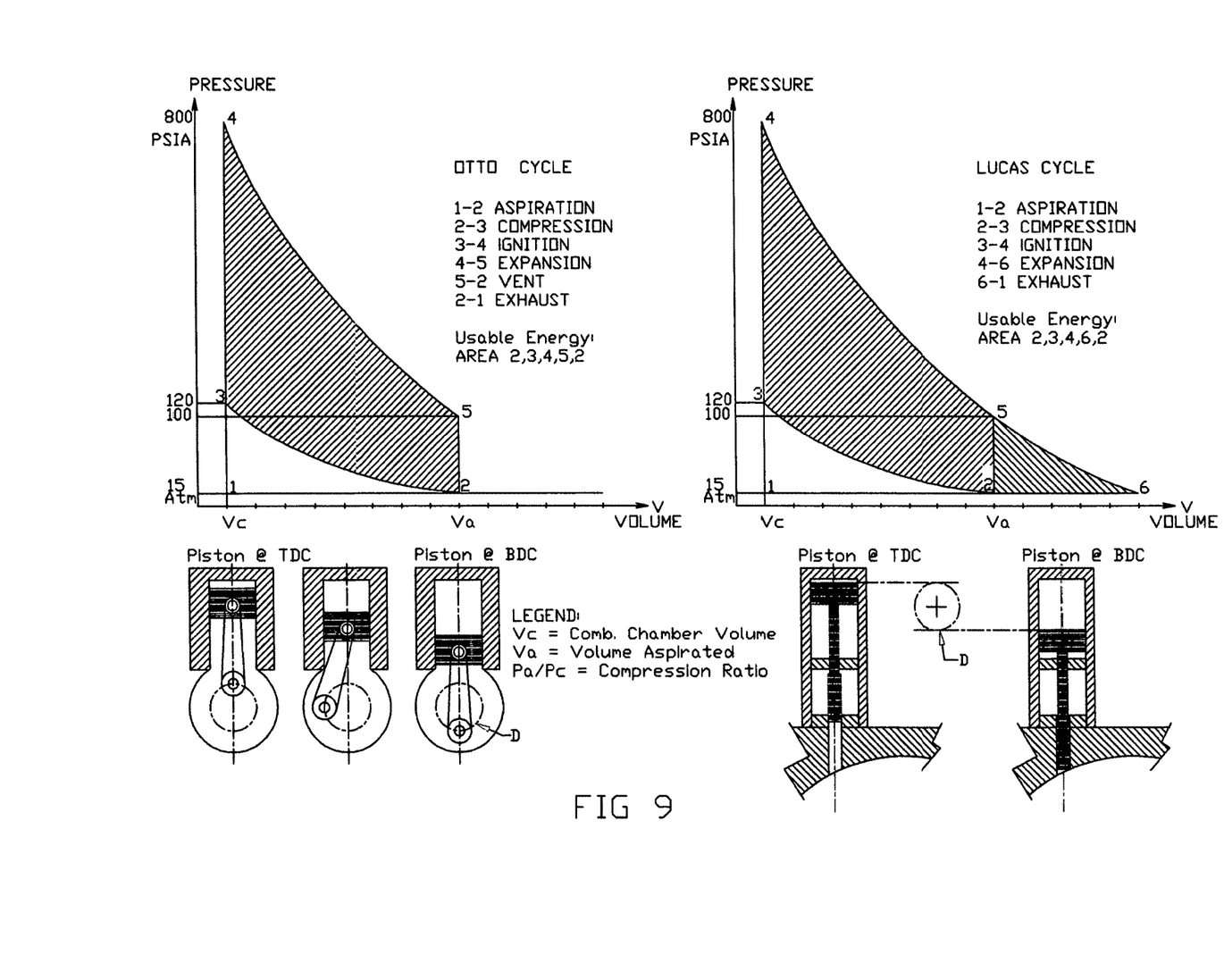
FIG. 9 shows a comparison between the Otto cycle and the Lucas cycle.

Note that FIG. 7 depicts the simplest configuration for easier understanding of the basic principle. Other configurations are shown in FIG. 8. Pay particular attention to the 2×3 configuration (two compressors, three rotor cavities) for this is the ideal engine for automobiles.

Another very important characteristic of the multiple compressor engines is that any number of compressors can be mechanically disabled and will not interfere nor absorb any power from the rotor. The air charge from the reservoir is not delivered to the respective combustion chamber, saving compressed air for when it is needed.

Conversely, the corresponding spark plug would be disabled as well. This allows the engine to be operated at the optimum fuel to air ratio to match power demands without wasted energy; P.E: the 2×3 configuration shown in Figure II below will operate with one, two, three and six explosions per revolution according to the power demand which is sensed and controlled automatically by the engine control system.

This power and torque variation closely approaches that of a standard automobile automatic transmission and in fact, eliminates the need for one. Eliminating the transmission does away with friction losses in the gear-train, reduces weight and consequently improves efficiency and mileage while reducing emissions. Lastly, it significantly reduces the cost of production. This is attractive to manufacturers and customers alike.

Yet another feature of this engine is that it has inherent variable compression ratio, a much desired and only recently implemented design into the most expensive piston engines. The variable compression ratio capability is said to greatly reduce emissions of pollutants, in particular those of nitrous oxide, while improving fuel economy.

FIG. 8 depicts various combinations of compressors and rotor chambers.

Single compressors are obviously cheaper to produce and should cover applications in light portable equipment such as hand-held blowers, trimmers (1×2), chain saws, push mowers, etc. (1×3).

Multiple compressor engines are required for higher power demands, like motorcycles, outboard motors, automobiles (2×3), light and heavy duty buses and trucks, helicopters and small airplanes (3×4).

Other configurations are possible, using a larger number of compressors and rotor cavities, P.E. 4×5 and 4×7 for applications requiring very large power at relatively low rpm, such as tractors and earth moving machinery, military vehicles, maritime propulsion and large electric power generators.

Besides economical construction, the optimal design shall take into consideration available space, torque requirements, control-ability and weight limitations.

Notice that the light weight of this engine and the large torque produced by the multiple compressor configurations makes it ideal for aircraft applications—high power-to-weight ratio.

Free-wheeling capability is ideal for auto-gyro type aircraft.

Figure 1:
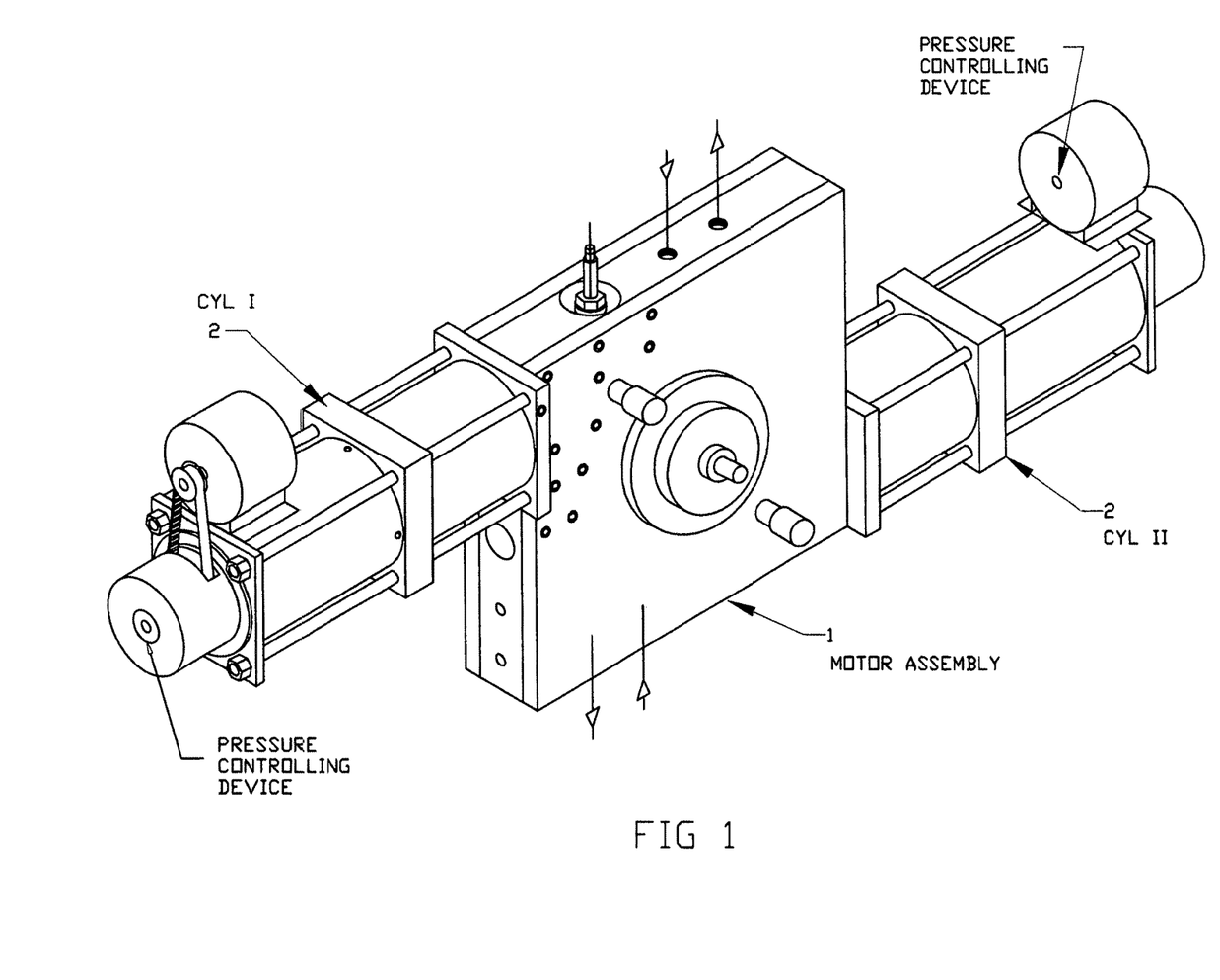
FIG. 1 Is a perspective view of a split-chamber rotary engine showing the location of the variable pressure controller of this invention on said engine.

In the preferred embodiment, the device of this invention, as seen in FIG. 1, will be mounted on the distal end of each compressor 2 that flank the motor assembly 1. Proceeding to FIG. 2, a front view of the invented mechanism, shows the stepping motor 6 having a timing pulley 7 mounted on its shaft.

Figure 2:
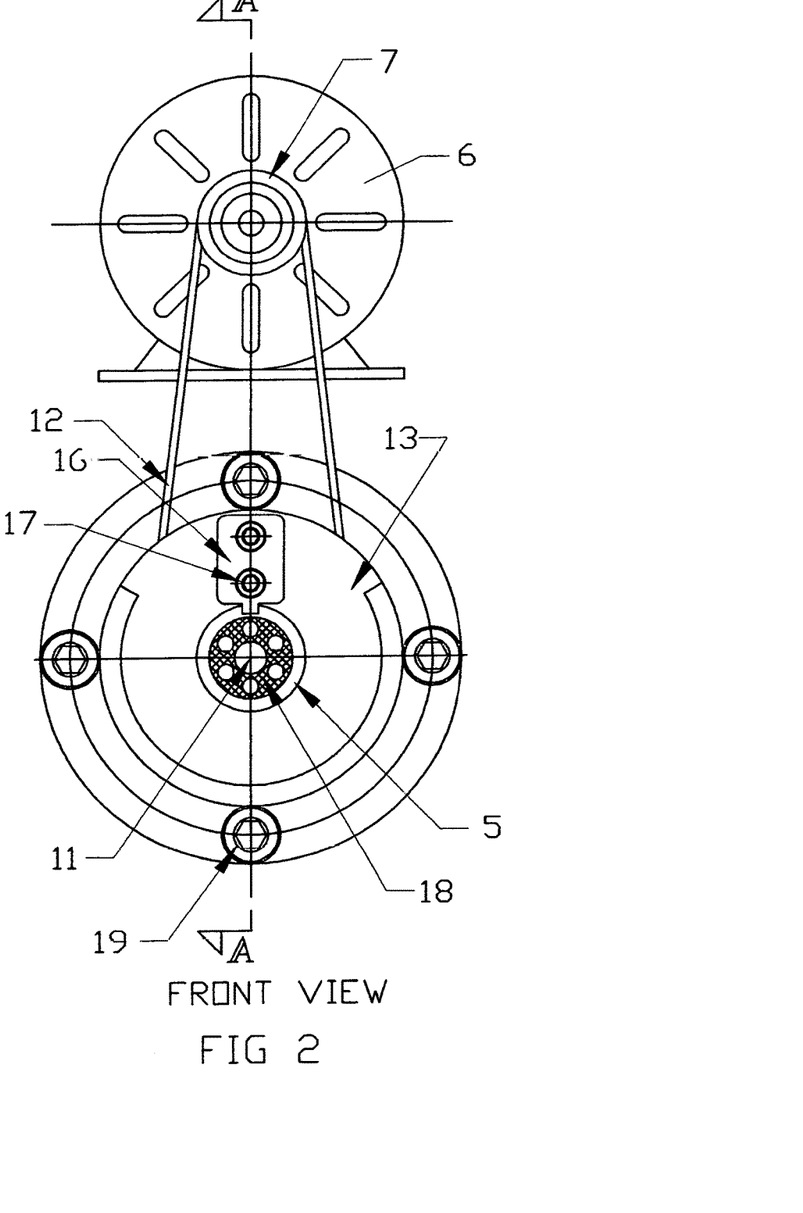
FIG. 2 front view of variable pressure controller facing the end of the compressor assembly.
Figure 3:
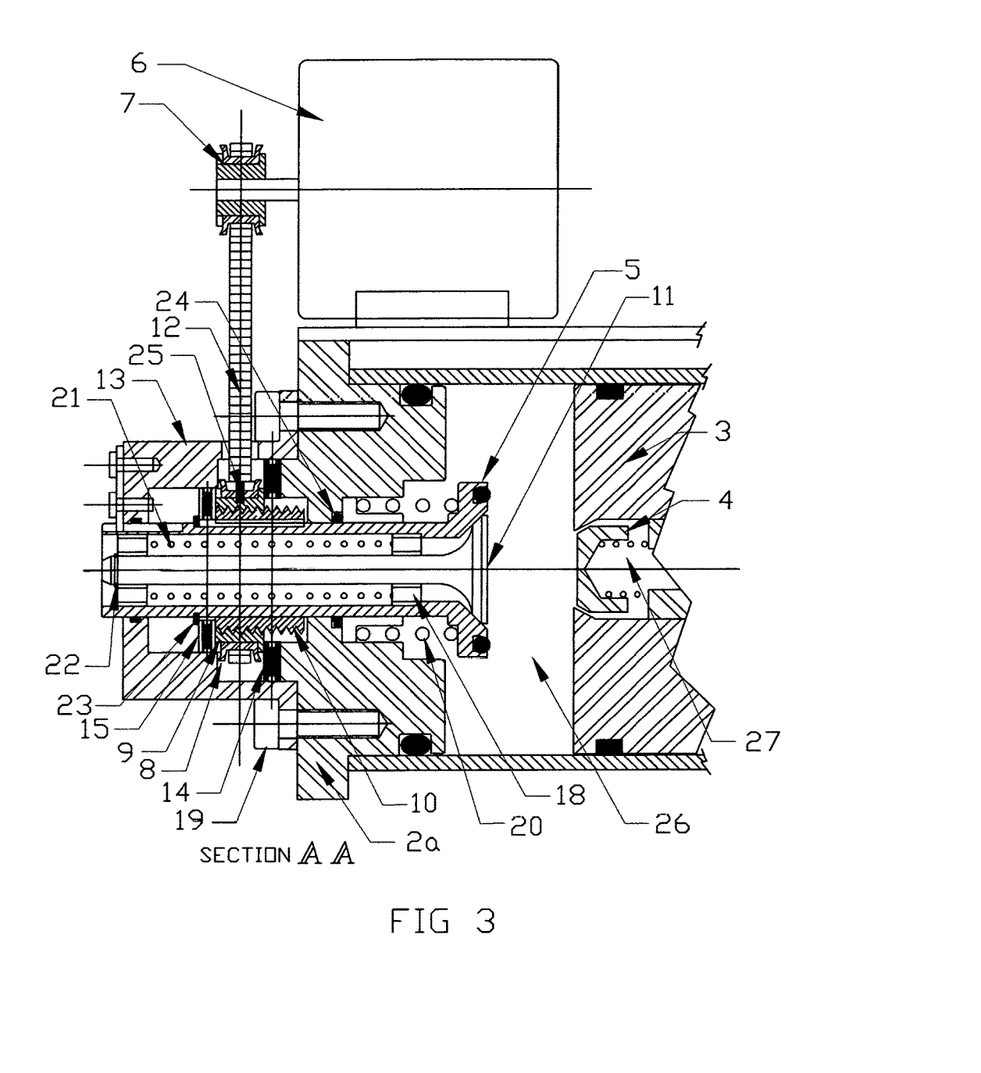
FIG. 3 section AA; A section through the center of the variable pressure controller as shown in FIG. 2, identifying its main components.

The stepping motor 6 will rotate the pulley 7 back or forward, puling or pushing the timing belt 12 that in turn rotates the larger timing pulley 8, as seen in FIG. 3. Affixed to the larger pulley 8 by a roll pin 25 is a threaded ring 9 that is coupled to a threaded sleeve 10 that in turn mounts over a cylindrical rod 5.

Anti-friction thrust bearings 14 and 15 are mounted at the distal end of the sleeve 10 and on near side of pulley 8, by means of a retaining ring 23. As seen in FIG. 2 the rod 5 is prevented from rotating by a tab 16 affixed to the housing 13 by screws 17, said tab 16 having a protrusion that lays on a longitudinal groove of the rod 5. The rod 5 is otherwise free to move linearly through the end-cap 2a (FIG. 3) of the compressor assembly 2 and the housing 13 in response to the pulses of motor 6.

The housing 13 is affixed to the end-cap 2a by a set of screws 19. A stationary ring 24 provides sealing between the compressor chamber 26 and the atmosphere. A strong spring 20 located between the end-cap 2a and the back of the cup from rod 5 maintains the this rod at the desired position when piston 3 is away.

Thus, the cupped end of the rod 5 approaches or distances itself from the moving piston 3 and upon contact with it, will occlude the opening there situated for the outlet valve 4 to communicates with the reservoir 27. It is by its adjustable position within the compression chamber 26 that this mechanism controls the pressure delivered to the accumulator 27.

In the preferred embodiment, an air intake valve 11 is incorporated in the center of the now hollow rod 5. Said valve 11 is of the classic tulip type, with its enlarged head recessed inside the cup of rod 5. There are a set of two perforated guides 18 (FIGS. 2 & 3), one stationary in reference to the rod 5 and another moveable, retained to the valve stem, at the distal end by a ring 22.

The perforated guides 18 allow the passage of air through to the compression chamber 26. A weak spring 21 mounted between the two guides 18 closes the valve 11 when the pressure inside the compression chamber 26 is near the atmosphere.

It should be obvious to those familiar with the art that the movement of the rod 5 can be controlled by a variety of mechanisms and standard components, such as linear motors, power screws, spring loaded cams and levers, hydraulic and pneumatic cylinders, etc.

Figure 4:
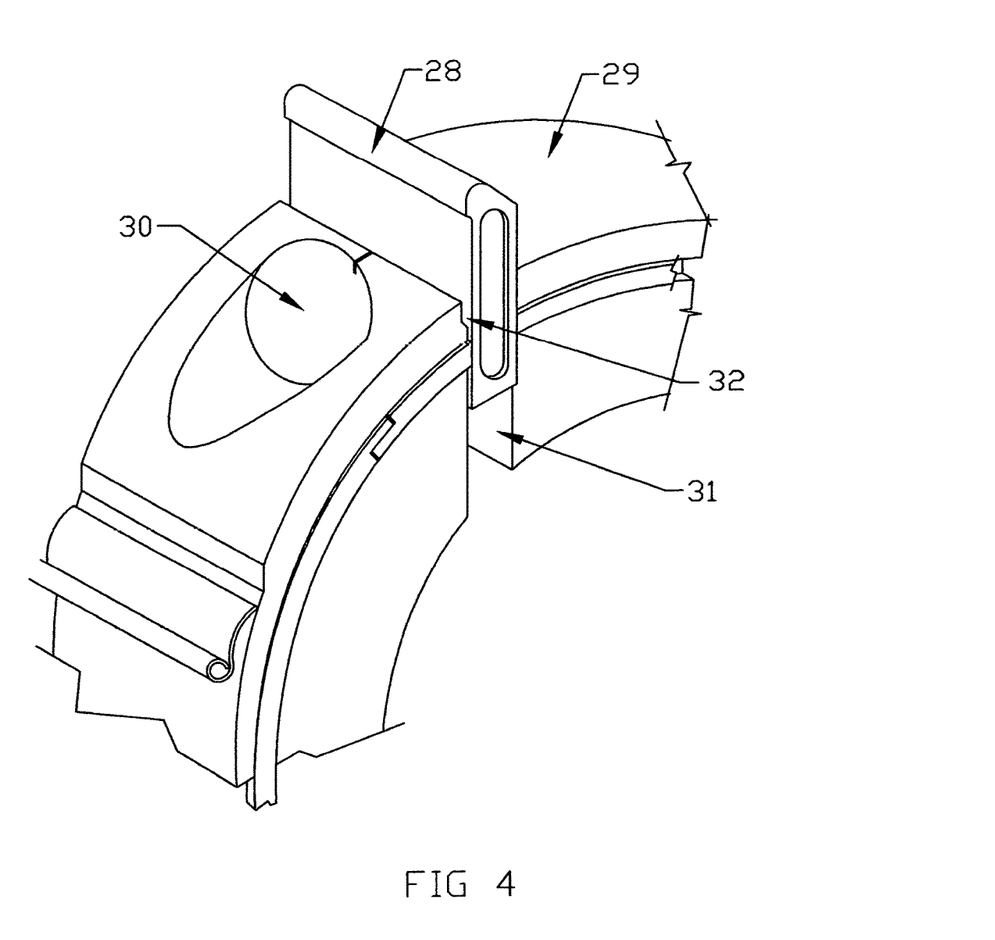
FIG. 4 Shows a perspective view of the vane and the rotor, placed within the motor housing or block. The vane is partially retracted inside the corresponding rotor groove, while its tip maintains contact with the internal surface of the block and follows it's geometry.
Figure 5:
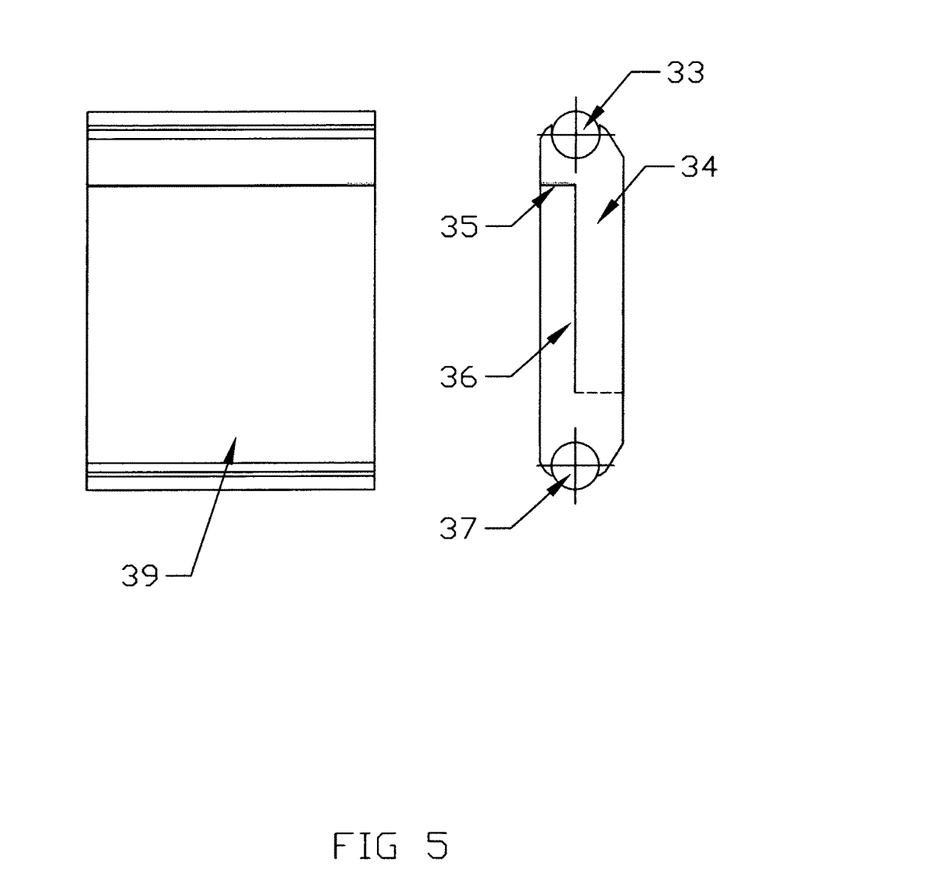
FIG. 5 Is a frontal and a side view of the vane assembly.
Figure 6:
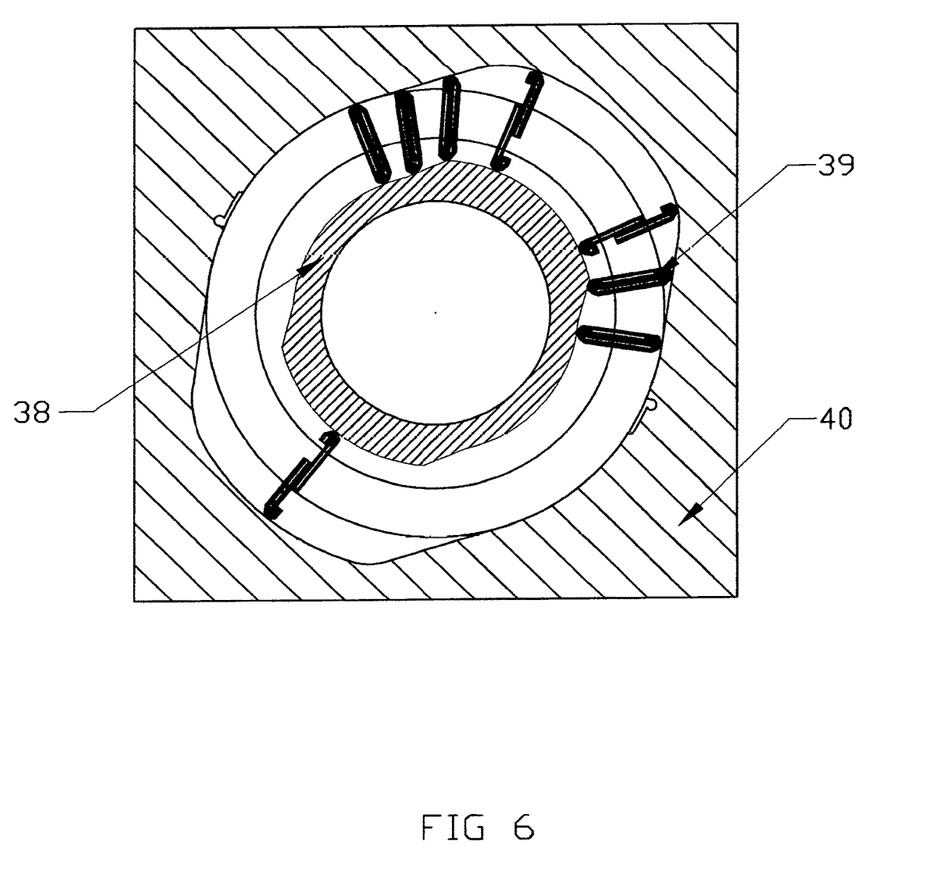
FIG. 6 shows a cutaway section of the engine showing a stationary cam the respective positions of the vane assemblies.

In yet another embodiment, an improved vane design as shown in pictures 4, 5 and 6 addresses the problems created by excessive forces at the vane tip that may cause the loss of sealing.

On FIG. 4 vane 28 is mounted inside groove 31 of the rotor 29. It is adjacent to half-chamber 30 of the rotor 29. There is a pocket 32 in the groove 31 that is provided to accommodate the retracted head of the vane 28. Moving to FIG. 5, the preferred embodiment, a vane assembly 39 consists of two components, identified as top vane 34 and an inverted vane 36. The top vane 34 has a transverse roller 33 mounted on top of it and a recess 35 that is approximately equal to the distance from the edge of the vane to the center of the roller 33. The recess provides for pressure compensation at the tip of the valve. The inverted vane 36 has a roller 37 mounted on its lower extremity.

Now on FIG. 6 we see the fixed cam or cams 38 that control the movement of the vane assemblies 39 as they follow the contour of the cavity of the housing 40.

What is claimed is:

1. A split-chamber rotary engine improvement, the split-chamber rotary engine comprising:
 a power module comprising:
  a rotor case having a rotor chamber wall defining a rotor volume and at least one expansion chamber and at least one case combustion chamber disposed therein, wherein the expansion and case combustion chambers are equal in number, at least one combustion chamber piston passage extending outwardly from the at least one case combustion chamber and being substantially tangential to the rotor chamber wall, and at least one exhaust passage extending outwardly from the at least one expansion chamber;
  a combustion chamber piston disposed for reciprocation within the combustion chamber piston passage of the case; and
  a rotor disposed within the case, the rotor having at least one combustion chamber portion formed peripherally therein and being at least equal in number to the rotor case combustion chambers, the combustion chamber piston, combustion chamber piston passage of the case, and combustion chamber portion of the rotor dealing a split combustion chamber within the case; and
 at least one compressor module extending from the corresponding combustion chamber piston passage of the case, the compressor module comprising;
  a compressor cylinder having a case attachment end and a closed distal end opposite the case attachment end;
  a compressor piston assembly disposed within the compressor cylinder;
  a connecting rod rigidly fixing the compressor piston assembly to the combustion chamber piston;
  an accumulator located within the compressor piston assembly; and
  an outlet valve mounted on the compressor piston assembly;
 the improvement comprising:
  one or more variable pressure controllers comprising:
   a hollow cylindrical rod having a cupped end configured to move linearly through an end-cap of the compressor piston assembly;
   a spring configured to maintain the hollow cylindrical rod at a desired position; and
   a tulip-type air intake valve incorporated in the center of the hollow cylindrical rod;
   wherein the cupped end of the rod is configured to approach or distance itself from the compressor piston assembly and upon contact therewith, occlude the outlet valve, thereby controlling pressure delivered to the accumulator.

2. The split-chamber rotary engine improvement of claim 1, further comprising:
 a stepper motor configured to drive a combination of two timing pulleys through a belt, wherein one of the timing pulleys includes an integral threaded nut, said nut being mounted on a threaded sleeve mounted on the rod.

3. The split-chamber rotary engine improvement of claim 1, wherein
 the intake valve is kept at the center of the hollow rod by a set of two perforated guides and is maintained shut by a spring.

4. The split-chamber rotary engine improvement of claim 1, further comprising:
 an externally threaded cap for moving a back wall of the compressor in relation to the compressor cylinder so as to reduce or enlarge a dead volume within the compressor.

5. The split-chamber rotary engine improvement of claim 1, wherein
 linear movement of the rod is controlled by components selected from the group consisting of: linear motors; power screws, spring loaded cams and levers, hydraulic and pneumatic cylinders.

6. The split-chamber rotary engine improvement of claim 1, further comprising:
 pressure compensated vanes inserted into the rotor.

7. The split-chamber rotary engine improvement of claim 6, further comprising:
 a recess under a rounded tip of the vanes.

8. The split-chamber rotary engine improvement of claim 6, further comprising:
 an angle of the vanes being offset from perpendicular to a tangent of the rotor so as to increase or decrease the vanes to rotor housing pressure.

9. The split-chamber rotary engine improvement of claim 6, wherein
   the vanes have a curved or slanted shape so as to minimize a force required to seal the vanes to a housing cavity.

10. The split-chamber rotary engine improvement of claim 6, wherein
   the vanes comprise an inverted vane slid-ably mounted against a vane, forming an integrated vane assembly.

11. The split-chamber rotary engine improvement of claim 10, further comprising:
   a cam or pair of fixed cams ridden by a lower roller of the vane assembly as the rotor turns, thereby moving the vane assemblies in and out of rotor grooves.

* * * * *